United States Patent
Reisswig et al.

(10) Patent No.: US 10,824,808 B2
(45) Date of Patent: Nov. 3, 2020

(54) ROBUST KEY VALUE EXTRACTION

(71) Applicant: SAP SE, Walldorf (DE)

(72) Inventors: Christian Reisswig, Berlin (DE);
Eduardo Vellasques, Berlin (DE);
Sohyeong Kim, Berlin (DE); Darko Velkoski, Berlin (DE); Hung Tu Dinh, Berlin (DE)

(73) Assignee: SAP SE, Walldorf (DE)

( * ) Notice: Subject to any disclaimer, the term of this patent is extended or adjusted under 35 U.S.C. 154(b) by 127 days.

(21) Appl. No.: 16/196,153

(22) Filed: Nov. 20, 2018

(65) Prior Publication Data
US 2020/0159828 A1 May 21, 2020

(51) Int. Cl.
| | |
|---|---|
| G10L 15/02 | (2006.01) |
| G06F 40/295 | (2020.01) |
| G06F 40/289 | (2020.01) |
| G06N 3/04 | (2006.01) |
| G06N 3/08 | (2006.01) |
| G06F 40/30 | (2020.01) |

(52) U.S. Cl.
CPC .......... *G06F 40/289* (2020.01); *G06F 40/30* (2020.01); *G06N 3/0454* (2013.01); *G06N 3/08* (2013.01)

(58) Field of Classification Search
CPC ............................... G10L 15/02; G06F 40/295
See application file for complete search history.

(56) References Cited

U.S. PATENT DOCUMENTS

| | | | |
|---|---|---|---|
| 10,303,768 B2* | 5/2019 | Divakaran | G06F 40/279 |
| 2005/0259866 A1* | 11/2005 | Jacobs | G06K 9/00463 382/157 |
| 2011/0222773 A1* | 9/2011 | Radakovic | G06K 9/00469 382/182 |
| 2013/0195376 A1* | 8/2013 | Baheti | G06T 11/60 382/289 |
| 2018/0137349 A1* | 5/2018 | Such | G06N 3/08 |
| 2018/0157643 A1* | 6/2018 | Andrassy | G06F 40/295 |

(Continued)

OTHER PUBLICATIONS

Yang, Zichao, et al. "Hiecirchical attention networks for document classification." *Proccedings of the 2016 Conference of the North American Chapter of the Association for Computational Linguistics: Human Language Technologies*. 2016, 10 pages.

*Primary Examiner* — Shreyans A Patel
(74) *Attorney, Agent, or Firm* — Sterne, Kessler, Goldstein & Fox P.L.L.C.

(57) ABSTRACT

Disclosed herein are system, method, and computer program product embodiments for robust key value extraction. In an embodiment, one or more hierarchical concepts units (HCUs) may be configured to extract key value and hierarchical information from text inputs. The HCUs may use a convolutional neural network, a recurrent neural network, and feature selectors to analyze the text inputs using machine learning techniques to extract the key value and hierarchical information. Multiple HCUs may be used together and configured to identify different categories of hierarchical information. While multiple HCUs may be used, each may use a skip connection to transmit extracted information to a feature concatenation layer. This allows an HCU to directly send a concept that has been identified as important to the feature concatenation layer and bypass other HCUs.

20 Claims, 7 Drawing Sheets

(56) References Cited

U.S. PATENT DOCUMENTS

| | | | |
|---|---|---|---|
| 2019/0043479 A1* | 2/2019 | Dorau | G10L 15/02 |
| 2019/0258854 A1* | 8/2019 | Hosabettu | G06K 9/66 |
| 2019/0265955 A1* | 8/2019 | Wolf | G06N 3/084 |
| 2019/0294729 A1* | 9/2019 | Jiang | G06K 9/00718 |
| 2020/0019609 A1* | 1/2020 | Yu | G06N 3/0454 |

* cited by examiner

ROBUST KEY VALUE EXTRACTION

BACKGROUND

As machine learning technology develops, techniques have been developed to recognize text patterns. For example, key value extraction is a technique that has been developed. Key value extraction may include identifying a key type and then a particular key value corresponding to the key type. For example, a machine learning system may encounter the text string "Addr.: Main St". By applying a key value extraction machine learning algorithm, the system may identify a key type as a "street name" category and a particular key value as "Main St" corresponding to the category. In this manner, key value extraction techniques may label portions of text and pair identified key values to key types.

Traditionally, the key value to key type pairs are well defined. The vocabulary may be well-know and the structure of text may appear in a clear pattern. For example, classes of documents like a tax form, legal document, or medical records may contain document structures that are easily readable. In these cases, a rules-based extraction may be used. This rules-based approach, however, may not scale well when constraints on the document types and document structures are relaxed. While techniques such as Named-Entity Recognition (NER) have been used to address this issue, this technique does not address the "hierarchy" of concepts that cannot be captured by a purely sequential model. Further, NER approaches typically make many assumptions about vocabulary, often facing issues when encountering spelling errors, abbreviations, or optical character recognition (OCR) errors.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for extracting key values and hierarchical context information using machine learning.

In an embodiment, a hierarchical concept unit (HCU) may be used, and/or chained to other HCUs, to extract key values from text inputs as well as to identify a "hierarchy" of concepts. This hierarchy may provide relational information between key types and key values. For example, a text string may state "Addr.: Main St" as a particular assignment. This example may demonstrate three concepts: (1) the key type of street name; (2) the key value of "Main St"; and (3) the assignment associating the key type to the key value. The key type and key value may represent two low-level concepts while the assignment may be a high-level assignment. In this manner, a hierarchy may exist with the high-level assignment of "Addr.: Main St" joining the two low-level key type and key value concepts.

Based on the configuration of the HCU, the HCU or chain of HCUs may identify the hierarchical nature of key value assignments from training dataset with annotations identifying the assignments. Based on the training dataset, the HCU structure may identify assignments in future documents in a robust manner without requiring additional post-processing. In this manner, the HCU structure may reduce processing and computational resource expenditure relative to other approaches such as Named-Entity Recognition (NER) approaches. Further, the HCU structure may reduce the amount of training data needed. The robust nature of the HCU structure may provide increased accuracy relative to NER approaches when analyzing real-world documents by better handling spelling errors, abbreviations, OCR errors, or other imperfections in a document. Based on this increased accuracy, the mapping of the hierarchical nature from characters to key types and values and to assignments may be performed with greater accuracy. Further, the HCU structure may be employed in temporal text environments such as chat bots.

To analyze text inputs, an HCU may use a convolutional neural network (CNN) layer followed by a recurrent neural network (RNN) layer. Using the CNN layer, the HCU may extract features from lower-level representations, such as, for example, a character-by-character analysis of provided input text. In this manner, the CNN may determine "context" about the input learned from the data. The HCU may then pass the context to a feature selector. The feature selector may select particular elements of the context and input elements to be sent to the next layer and/or determine whether to send the elements to the RNN layer or to perform a "skip connection" to by-pass the RNN layer. This skip connection will be further described in the context of a chain of HCUs.

If the information is sent to the RNN layer, the RNN layer may analyze the sequential dependencies between the features received from the feature selector. For example, the RNN layer may apply a time-step analysis to determine other contextual information. Based on this temporal processing, the RNN may generate additional contextual information. The HCU may apply another feature selector following the RNN analysis to determine whether to perform a skip connection with this contextual information.

In an embodiment, multiple HCUs may be chained together, or stacked, so that a particular HCU may receive concept information from a preceding HCU. The particular HCU may then perform further analysis to extract new concepts. In an embodiment, a first HCU may analyze individual characters. The next HCU may analyze pseudo-words while a third HCU may analyze pseudo-sentences and a fourth HCU may analyze pseudo-paragraphs. The HCU arrangement and configuration may be altered depending on different settings and/or training sets applied to the HCUs.

Similarly, more or fewer HCUs may be chained depending on the application and degree of contextual information desired to be captured.

After a particular HCU analyzes received concept information, the particular HCU may generate new concepts based on the analysis. The particular HCU may then send the new concepts to a subsequent HCU and/or a feature concatenation layer. The feature concatenation layer may aggregate the concepts received from all HCUs. For example, the feature concatenation layer may receive concepts from HCU feature selectors that have used the skip connection process. The aggregated concepts may then be passed to another CNN layer to perform a final feature selection on the concepts.

The final CNN layer may identify the particular HCUs providing different conception information. For example, the final CNN layer may determine the transformation of a low-level concept (such as, for example, a character) to a high level concept (such as, for example, key types and key values). Further, the final CNN layer may then send this information to a fully connected neural network to determine key value probabilities.

This HCU network configuration may allow for determining hierarchical dependencies that occur in key value assignments. Each HCU may use the CNN layers within to "focus" on particular levels of the hierarchy of concepts. For example, a first HCU may focus individual character concepts while a second HCU may focus on concepts related to words.

Further, by recognizing the particular HCU that produced conceptual information, the fully connected neural network may be able to provide "explainability." Explainability may provide an understanding as to why a particular machine learning model "learned" a given concept at a particular level. That is, the particular HCU providing a concept may be identified to discover and/or troubleshoot issues or undesired results from a machine learning process. This explainability may aid in conforming with machine learning regulations such as, for example, the European Union's General Data Protection Regulation (GDPR) by providing explainability. Further, the explainability may aid in preventing bias in data acquisition.

Various embodiments of these features will now be discussed with respect to the corresponding figures.

Figure 1:
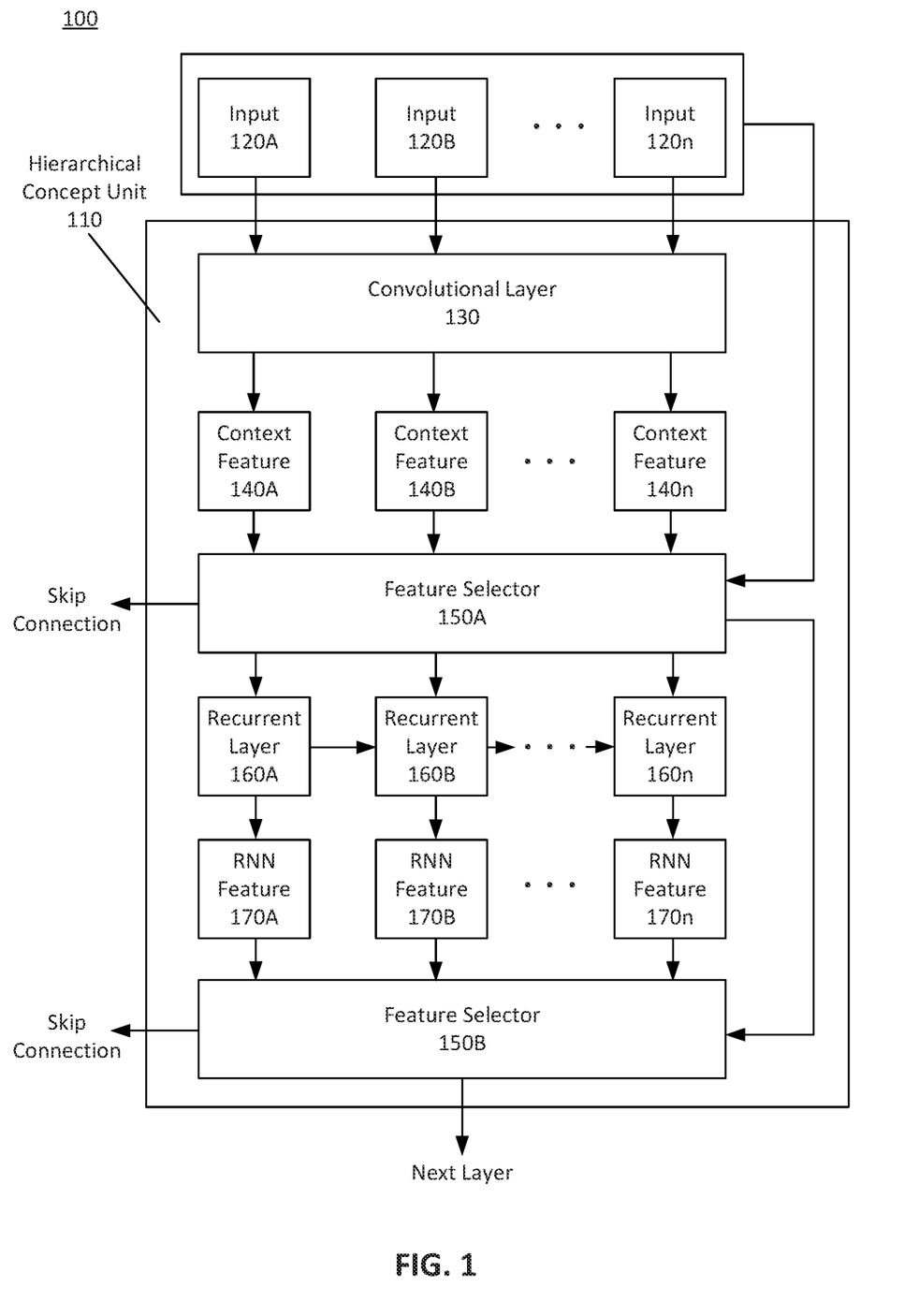
FIG. 1 depicts a block diagram of a hierarchical concept unit (HCU) environment, according to some embodiments.

FIG. 1 depicts a block diagram of a hierarchical concept unit (HCU) 110 environment 100, according to some embodiments. The environment 100 displays an HCU 110 along with an input 120 to HCU 110. HCU 110 may produce outputs from a feature selector 150 using a skip connection and/or may produce a "next layer" output that may send concept information to a subsequent HCU. For example, HCU 110 may be included in a chain of HCUs. Example embodiments of chain HCUs are further described with reference to FIG. 3A and FIG. 3B. HCU 110 and/or an HCU chain may be implemented using a computer system as described with reference to FIG. 6. In an embodiment, HCU 110 may be implemented into a computer system employing machine learning technologies.

HCU 110 may receive an input 120 at a convolutional layer 130. Input 120 may be a document and/or text. For example, input 120 may be a computer file having text and/or other readable symbols. The text may include different characters. Input 120 may be an image and/or a file where optical character recognition (OCR) has been performed. In this case, the file may include the OCR character information.

If HCU 110 is located in a chain of HCUs, HCU 110 may receive the output of a previous HCU as input 120. For example, input 120 may be a feature concatenation of concepts received from a feature selector of a previous HCU. This HCU output will be further described below.

HCU 110 may receive input 120 at a convolutional layer 130. Convolutional layer 130 may include a convolutional neural network (CNN) and/or a block comprising multiple CNNs. The convolution may be a one-dimensional convolution operation. This convolution may be a smoothing operation such as, for example, a moving average. Convolutional layer 130 may perform the smoothing using a soft mask. The soft mask may use weights that have been trained using training datasets. In an embodiment, these weight may be learned using back-propagation. After applying the smoothing, convolutional layer 130 may apply a non-linear function according to the configuration of how the CNN was trained. The non-linear function may be, for example, a sigmoid, hyperbolic tangent, or piece-wise linear function, such as, for example, a Rectified Linear Unit.

After applying input 120 to convolution layer 130, convolution layer 130 may produce context information as a context feature 140. Context feature 140 may refer to data related to the input text depending on which input elements the convolution layer 130 was trained to identify. For example, if convolution layer 130 is trained to identify patterns based on individual characters, convolution layer 130 may produce context features 140 based on characters. Convolution layer 130 may identify punctuation marks such as a period, question mark, exclamation, parenthesis, or other symbols. Convolution layer 130 may then identify this contextual information as a context feature 140 to designate a particular feature of input 120. For example, convolution layer 130 may indicate the separation of sentences based on identified punctuation.

Similarly, if convolution layer 130 is trained to identify words or groups of characters, convolution layer 130 may provide context features 140 that identify particular words. For example, convolutional layer 130 may identify key values. In this manner, as multiple HCUs are chained, contextual information from varying levels of granularity may be identified and may aid in identifying key types and key values. This variation may also aid in identifying slight variations or differences in words or characters. For example, convolutional layer 130 may provide character context information to distinguish between the words "like" or "likely." Depending on how convolution layer 130 is trained, convolutional layer 130 may identify these two words as having a different context feature 140. Similarly, using a character-level approach may allow convolutional layer 130 to identify and/or distinguish errors or misspellings of words or identify abbreviations or acronyms. Similarly, if convolutional layer 130 is trained to word-based errors, convolutional layer 130 may identify grammatical errors. In this manner, convolutional layer 130 and the HCU structure may avoid the use of a fixed vocabulary while still providing character, word, or even further groupings of for key value identification. This information may be identified as a context feature 140.

In an embodiment, convolution layer 130 may use multiple masks to generate multiple channels of convolution. Each mask may correspond to a channel of the convolution. The channels may produce different context features 140 corresponding to different inputs 120. HCU 110 may transmit the context features 140 to a feature selector 150A.

Feature selector 150A may select the particular context features 140 to send to a subsequent layer. For example, feature selector 150A may select a subset of the context features 140 that are deemed important or relevant to determining an overall context or hierarchy. Feature selector 150A may make this determination using an internal convolutional layer or neural network that may be trained using datasets. Feature selector 150A may also use input 120 when making this determination.

In addition to determining which context features 140 to select, feature selector 150A may also determine where to send the context features 140. For example, feature selector 150A may determine whether to send the context features 140 to recurrent layer 160, to feature selector 150B, or to use a skip connection to send context features 140 to a feature concatenation layer. In this manner, feature selector 150A may also determine where to send the selected context features. Using a skip connection may allow feature selector 150A to designate particular context features 140 that are relevant to hierarchical information and/or key value information. Based on this designation, feature selector 150A may transmit the particular context features 140 to the feature concatenation layer to perform the key value analysis. An embodiment of feature selector 150A is further described with reference to FIG. 2.

In addition to using a skip connection, feature selector 150A may pass context features 140 to recurrent layer 160. Feature selector 150A may pass context features 140 if feature selector 150A determines that a temporal analysis should be applied to context features 140. Recurrent layer 160 may include a recurrent neural network (RNN). Recurrent layer 160 may apply time step analyses to context features 140. For example, at each time step, recurrent layer 160 may apply a linear transformation to its input followed by a non-linear function similar to those used in convolutional layer 130. In an embodiment, recurrent layer 160 may maintain an internal state of transformations from previous time steps. In this manner, recurrent layer 160 may determine temporal contextual information.

Recurrent layer 160 may receive an observed input, such as the output from feature selector 150A. Recurrent layer 160 may also receive the input from other layers. Recurrent layer 160 may also recognize a state input, which may correspond to the previous time step. With this information, recurrent layer 160 may generate a state output and/or a logit. A state output may be used as context at the next time step. To illustrate these time-step operations, FIG. 1 depicts recurrent layer 160A as a first time step and recurrent layer 160B as a following time-step. Each recurrent layer 160 block may correspond to a particular time-step. Based on the processing, recurrent layer 160A may produce a state output which may be used as contextual information during the next time step.

Recurrent layer 160 may also produce a logit as RNN feature 170 to pass to feature selector 150B. The logit may be a vector of raw or non-normalized predictions that is generated by the RNN classification model. The logit may be passed to a non-linear function or a normalization function. After passing through the non-linear function, the result may then be forwarded to another layer. This processing may occur at feature selector 150B which may include a feature concatenation layer and/or a convolutional layer.

Figure 3A:
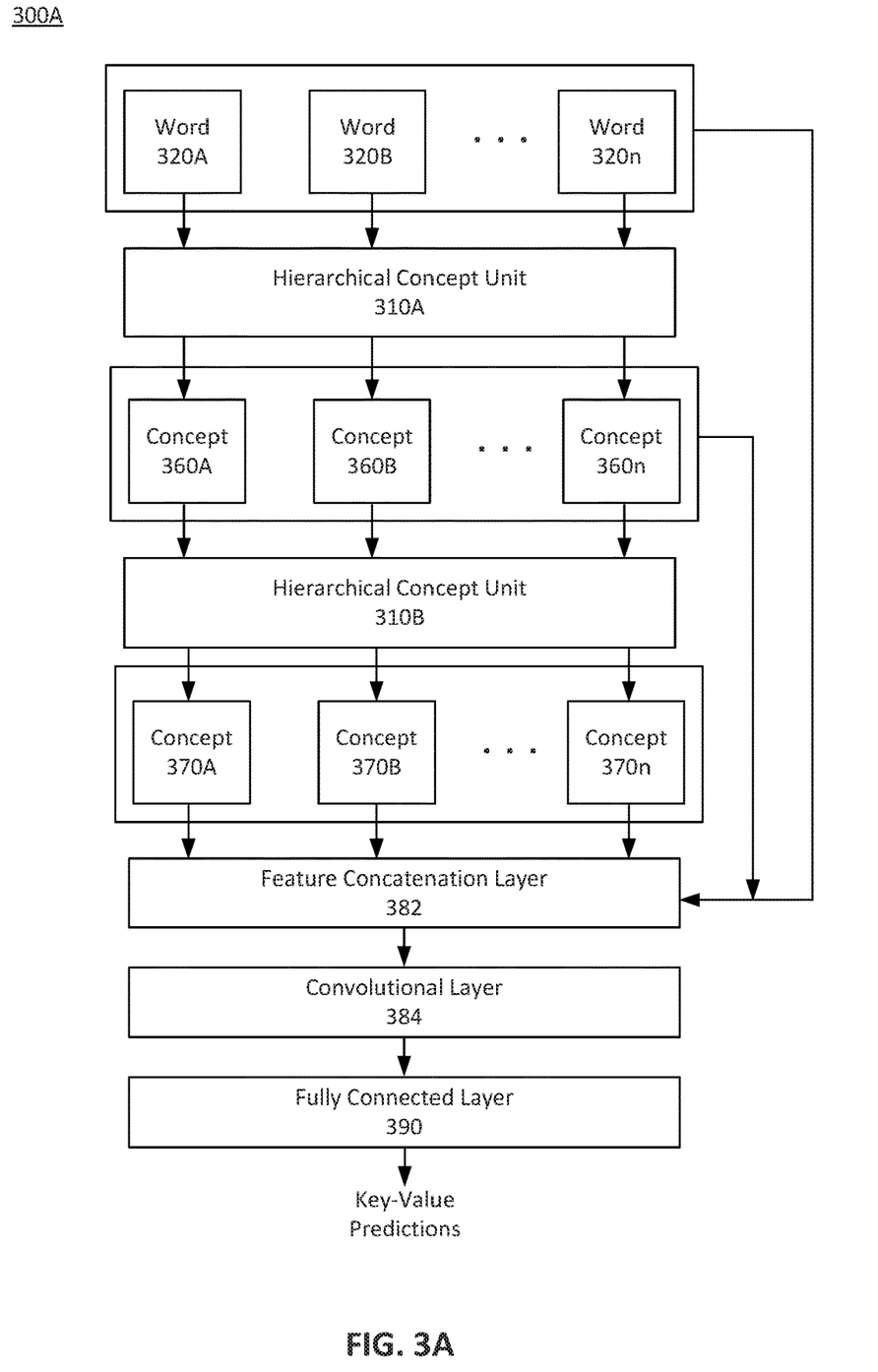
FIG. 3A depicts a block diagram of a chained HCU configuration, according to some embodiments.
Figure 3B:
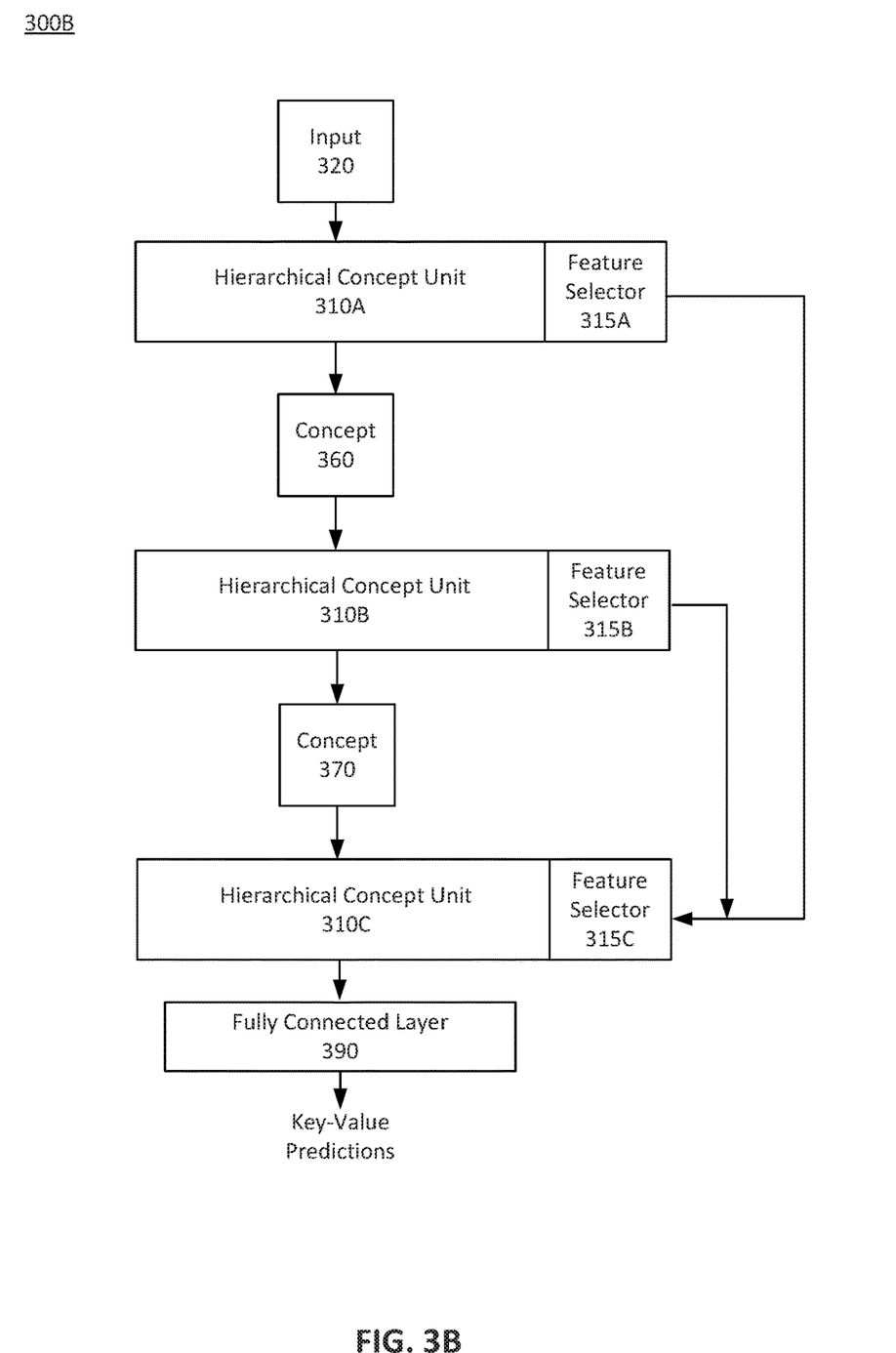
FIG. 3B depicts a block diagram of a chained HCU configuration displaying a feature selector communication, according to some embodiments.

Feature selector 150B may operate in a manner similar to feature selector 150A. Based on the configuration of feature selector 150B and/or the convolutional layer, feature selector 150B may use a skip connection and/or may determine to pass a RNN feature 170 to the following layer. The following layer may be a subsequent HCU depending on whether HCU 110 precedes another HCU. The following layer may also be a feature concatenation layer as shown in FIG. 3A. The feature concatenation layer may represent the aggregation of contextual information to determine key value and/or a hierarchical concept. In an embodiment, HCU 110 may also pass a RNN feature 170 to a fully connected layer depending on the configuration of the chain of HCUs. An example embodiment of this configuration is depicted in FIG. 3B.

In an embodiment, because HCU 110 includes convolutional layer 130 including one or more convolutional neural networks (CNNs), HCU 110 may apply down-sampling or up-sampling in order to allow the subsequent RNNs to learn either sub-word or multi-word structures in a text. These structures could be pseudo-words in the case of a down-sampling. In cases where the text is down-sampled further, the structures could also be pseudo-phrases. Through the use of down-sampling, HCU 110 may capture hierarchical dependencies with different levels of granularity. For example, the granularity may be morphological, discourse, or even rhetorical depending on the magnitude of down-sampling. Up-sampling may reverse this process. HCU 110 may map low-granularity concepts back to the input space using up-sampling. For example, HCU 110 may produce a character-level segmentation mask from a pseudo-word representation.

As previously discussed, HCU 110 may be chained and/or stacked with other HCUs. This linking may cause an overlap in particular components. For example, feature selector 150A and/or 150B may include a feature concatenation layer and/or a convolutional layer. In this manner, the output from HCU 110 may represent context features fed into a subsequent HCU. Similarly, convolutional layer 130 may overlap in components from the feature selection from a previous HCU. Because HCU 110 may overlap in components with other HCUs, some HCU configurations may reduce the need for multiple instances of layer that may be shared between HCUs.

Figure 2:
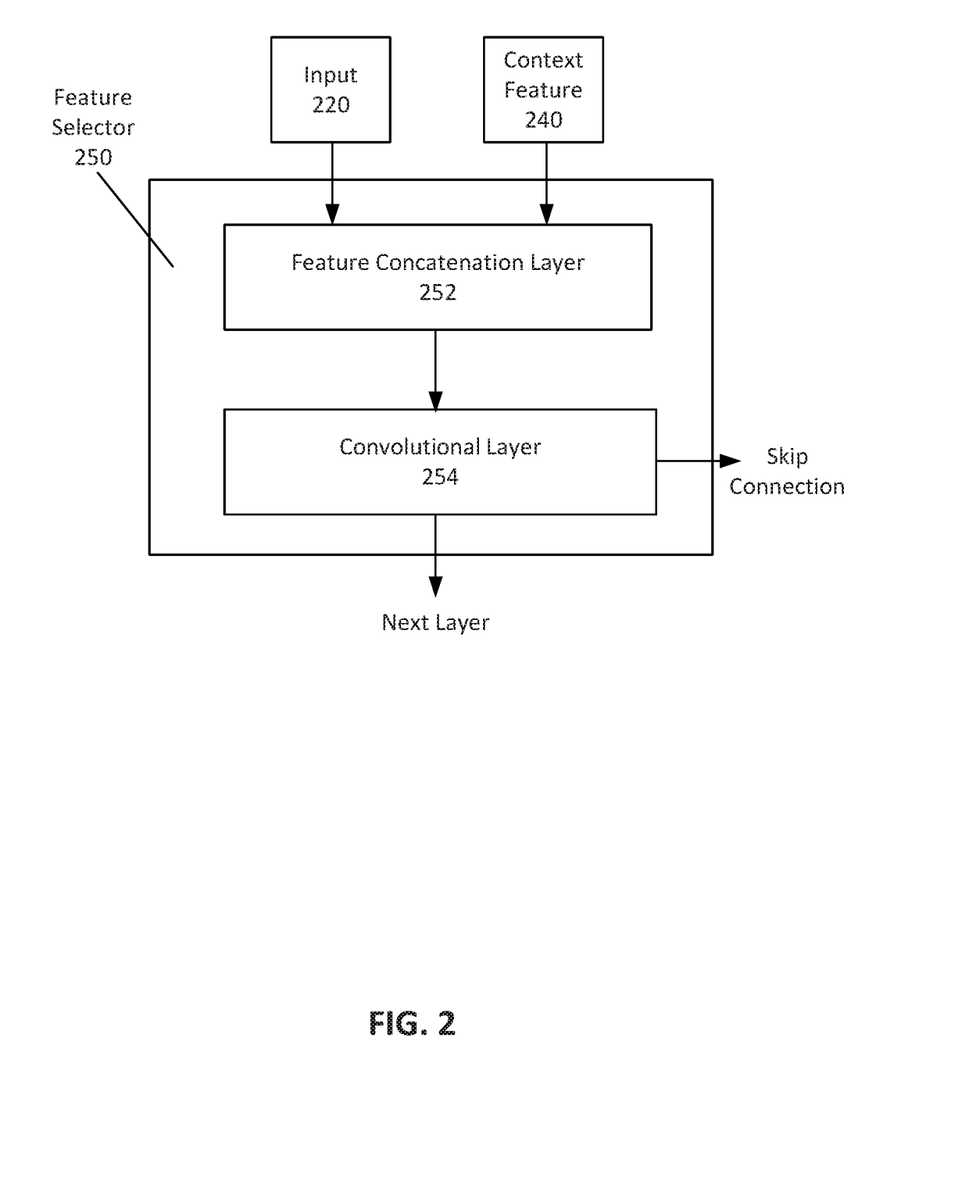
FIG. 2 depicts a block diagram of a feature selector, according to some embodiments.

FIG. 2 depicts a block diagram of a feature selector 250, according to some embodiments. Feature selector 250 may be implemented in an HCU, such as, for example, HCU 110. Feature selector 250 may operate in a manner similar to feature selectors 150A and 150B as described with reference to FIG. 1. For example, feature selector 250 may select one or more context features or RNN features. This selection may be performed depending on the configuration of feature concatenation layer 252 and/or convolutional layer 254.

To perform a selection of one or more context features, feature concatenation layer 252 may receive input 220 and/or context feature 240. Input 220 may be similar to input 120. For example, input 220 may include character and/or text strings. Context feature 240 may be similar to context feature 140 and/or RNN feature 170 depending on the location of feature selector 250 in a configuration of an HCU. For example, if feature selector 250 follows a convolutional layer such as convolutional layer 130, context feature 240 may be the result provided by convolutional layer 130. If feature selector 250 follows a recurrent layer such as recurrent layer 160, context feature 240 may be the result provided by recurrent layer 160.

At feature concatenation layer 252, feature selector 250 may receive one or more inputs 220 and/or context features 240. In this manner, feature selector 250 may receive original input information such as character strings as well as contextual information determined by a previous processing layer. Feature selector 250 may apply further processing depending on the configuration of feature concatenation layer 252 and/or convolutional layer 254. Feature concatenation layer 252 may aggregate multiple inputs so that convolutional layer 254 may apply a machine learning algorithm to identify further context elements. In this manner, feature selector 250 may apply another convolutional determination using multiple inputs with one of the inputs possibly being received from a previous machine learning layer. Feature selector 250 may determine additional context information based on the received context features 240.

To identify this additional context information, feature concatenation layer 252 may aggregate received input 220 and context feature 240. The aggregated information may be passed to convolutional layer 254 to apply a machine learning algorithm based on the aggregated information. Convolutional layer 254 may include a convolutional neural network. The convolution window may use a size of one (1). Convolutional layer 254 may have been trained using a dataset. Depending on how convolutional layer 254 is trained, convolutional layer 254 may identify different context features. Convolutional layer 254 may identify patterns based on the aggregation of input 220 and context feature 240. In this manner, convolutional layer 254 may apply a second layer of processing based on the context information identified from a previous machine learning layer. For example, a previous machine learning layer may have identified different context features of the input. Based on the training of convolutional layer 254, feature selector 250 may select particular context features 240 and/or particular elements from input 220 to be sent to the next layer. In this manner, feature selector 250 may act as a filter and/or identify the particular input 220 elements and/or context features 240 that are deemed important based on the configuration of convolutional layer 254.

Convolutional layer 254 may also determine the location of transmission of the selected input 220 elements and/or context features 240. For example, convolutional layer 254 may determine whether to pass the selected input 220 and/or context features 240 to a subsequent layer and/or to utilize a skip connection to pass the selected elements to another feature selector and/or another feature concatenation layer.

For example, as seen from FIG. 1, feature selector 250 may operate in a configuration similar to feature selector 150A. Feature selector 250 may determine when to pass a received context feature 240 from convolutional layer 130 to recurrent layer 160. Feature selector 250 may also pass an input 220 and/or context feature to a separate feature selector, such as feature selector 150B. This transmission may bypass recurrent layer 160. This connection may allow for the passage of a particular input 220 through an HCU and/or throughout multiple HCUs. Feature selector 250 may preserve input 220 and/or allowing subsequent feature selectors to use input 220.

Feature selector 250 may also utilize a skip connection. The skip connection may represent a passage of selected context features 240 and/or inputs 220 from an HCU to a feature concatenation layer. Using a skip connection, feature selector 250 may bypass one or more HCUs. Feature selector 250 may transmit a selected context feature 240 and/or input directly to a feature concatenation layer depending on the configuration of convolutional layer 254. Feature selector 250 may use a skip connection to indicate that a particular feature is important to determining a key value and/or a probability or confidence in the key value. In this manner, feature selector 250 may indicate that the identified context feature 240 and/or input 220 does not need further processing from an HCU. While feature selector 250 may identify particular context features 240 and/or inputs 220 to pass using a skip connection, feature selector 250 may also pass these selected elements to a next layer. In an embodiment, feature selector 250 may pass one or more context features 240 and/or inputs 220 using a skip connection and the next layer. In an embodiment, feature selector 250 may select different context features 240 and/or inputs 220 to pass using a skip connection than context features 240 and/or inputs 220 to pass to the next layer. If feature selector 250 produces an output for an HCU (e.g., if feature selector 250 is similar to feature selector 150B), feature selector 250 may produce a hierarchical concept as an output.

In an embodiment, the skip connection may allow information to flow between layers. In this case, aggregation need not occur at each HCU in a chain. For example, a first HCU may focus on learning a word representation and output one concept vector per word. The next HCU may focus on sentence representation and output one concept vector per sentence. By using a skip connection, a final layer may be responsible for key value classification. A greater amount of context about the transformations performed by previous HCUs may be identified via the use of skip connections.

FIG. 3A depicts a block diagram of a chained HCU configuration 300A, according to some embodiments. HCU configuration 300A may include one or more HCUs 310 that are connected process input words 320. In HCU configuration 300A, a particular HCU, such as HCU 310B, may receive concept 360 information from a preceding HCU, such as HCU 310A. Concept 360 information may be hierarchical concept information. Using this information, HCU 310B may extract new concepts 370. In an embodiment, HCU 310B may send new concepts 370 to another HCU (not pictured in FIG. 3) or to feature concatenation layer 382.

Feature concatenation layer 382 may aggregate the concepts from the HCUs 310 in HCU configuration 300A. For example, feature concatenation layer 382 may receive one or more concepts 360 from HCU 310A as well as one or more concepts 370 from HCU 310B. If other HCUs exist in a chain of HCUs, feature concatenation layer 382 may also receive one or more concepts from those HCUs. Feature concatenation layer 382 may aggregate these concepts. In this manner, the hierarchical concept information extracted at each HCU may be aggregated and analyzed.

After aggregating the concepts, feature concatenation layer 382 may pass the aggregated concept information to convolutional layer 384. Convolutional layer 384 may apply a convolutional neural network to the aggregated concept information. Convolutional layer 384 may apply a convolution having a window size of one (1). The convolution performed on the aggregated concept information may operate in a manner similar to a feature selector; however, convolutional layer 384 may perform the convolution on the hierarchical concepts yielded from an HCU 310 rather than selecting particular context features. This type of convolution at convolutional layer 384 may allow for learning of how to transform a lower-level concept (such as, for example, a character) to a higher-level concept (such as, for example, key types and key values). Convolutional layer 384 may also identify the particular processes applied by each HCU to perform its processing or transformation to yield a selected concept.

After selecting particular hierarchical concepts at convolutional layer 384, HCU configuration 300A may apply the selected hierarchical concepts to a fully connected layer 390. Fully connected layer 390 may use a fully connected neural network. This neural network may apply a linear combination of concepts and/or weights followed by a non-linear function. Based on this processing, fully connected layer 390 may produce one or more key value predictions and/or a probability associated with each key value prediction.

By chaining together HCUs 310, each HCU 310 may capture hierarchical dependencies that may occur in key value assignments. Further, because each HCU 310 includes a convolutional layer, a system using HCU configuration 300A may identify the level of the hierarchy corresponding to a particular HCU. For example, the system may inspect the portions of HCU configuration 300A that correspond to each level of the hierarchy of concepts. In this manner, the system may identify the focus of each HCU 310. Similarly, the system may identify and/or understand why a particular HCU 310 "learned" particular hierarchical concepts based on its output. In this manner, HCU configuration 300A provides "explainability."

Explainability is a concern in machine learning because of possible bias in data acquisition. For example, regulations such as the European Union's General Data Protection Regulation (GDPR) provide guidelines for explainability and for artificial intelligence or machine learning programs to provide an explanation for a particular result. A system using HCU configuration 300B may identify the particular HCU 310 that has selected a particular concept. In this manner, HCU configuration 300B allows the system to discover and/or troubleshoot issues or undesired results resulting from the machine learning process. This segmentation and/or identification of a particular HCU 310 may aid in providing explainability.

FIG. 3B depicts a block diagram of a chained HCU configuration 300B displaying a feature selector 315 communication, according to some embodiments. HCU configuration 300B may be similar to HCU configuration 300A in the operation of each HCU 310. Each HCU 310 may include a feature selector 315. The feature selector 315 of each HCU 310 may correspond to feature selector 150A and/or feature selector 150B as described with reference to FIG. 1.

HCU configuration 300B displays a communication path from one or more feature selectors 315A or 315B to feature selector 315C. For example, feature selector 315C may include a feature concatenation layer and/or a convolutional layer. In this manner, feature selector 315C may act in a manner similar to feature concatenation layer 382 and/or convolutional layer 384 as described with reference to FIG. 3A.

In HCU configuration 300B, HCU 310A may receive an input 320. Input 320 may be character and/or text strings. HCU 310A may process input 320 in a manner similar to HCU 110 or HCU 310A. Feature selector 315A from HCU 310A may select one or more context features to pass to feature selector 315C. This passing of features may correspond to a skip connection. The skip connection may allow feature selector 315A to skip over HCU 310B when providing feature information to feature selector 315C. Similarly, feature selector 315A may generate one or more hierarchical concepts 360 to pass to HCU 310B. In an embodiment, feature selector 315A may also pass input 320 information to HCU 310B for processing depending on the training of feature selector 315A.

HCU 310B may receive concept 360 and/or input 320 depending on the elements received from HCU 310A. HCU 310B may then analyze these elements according to the training of the neural networks in HCU 310B. In an embodiment, HCU 310B may be trained to identify hierarchical concepts that differ from HCU 310A. In this manner, using multiple HCUs 310 may allow for the identification of multiple different hierarchical concepts with different layers of organization. HCU 310B may generate these hierarchical concepts as concept 370. Feature selector 315B may also pass one or more features and/or input 320 to feature selector 315C.

Feature selector 315C may correspond to HCU 310C. HCU 310C may include a convolutional layer and a recurrent layer along with feature selector 315C. Feature selector 315C may be configured to follow processing performed by a recurrent layer. Feature selector 315C may include a feature concatenation layer and/or a convolutional layer. These elements may be similar to feature concatenation layer 382 and convolutional layer 384 as described with reference to FIG. 3A. In HCU configuration 300B, rather than having separate layers, feature concatenation layer 382 and convolutional layer 384 may be implemented using feature selector 315C of an HCU 310 in the chain. In this manner, other feature selectors 315 using a skip connection may transmit identified features to a designated feature selector within an HCU 310. In an embodiment, feature selector 315C may correspond to a final HCU 310C in an HCU chain.

Feature selector 315C may perform the aggregation of features as well as convolutional neural network processing. Feature selector 315C may then pass this information to fully connected layer 390. Fully connected layer 390 may operate in a manner similar to fully connected layer 390 as described with reference to FIG. 3A. Fully connected layer 390 may use a fully connected neural network. This neural network may apply a linear combination of concepts and/or weights followed by a non-linear function. Based on this processing, fully connected layer 390 may produce one or more key value predictions and/or a probability associated with each key value prediction.

Figure 4:
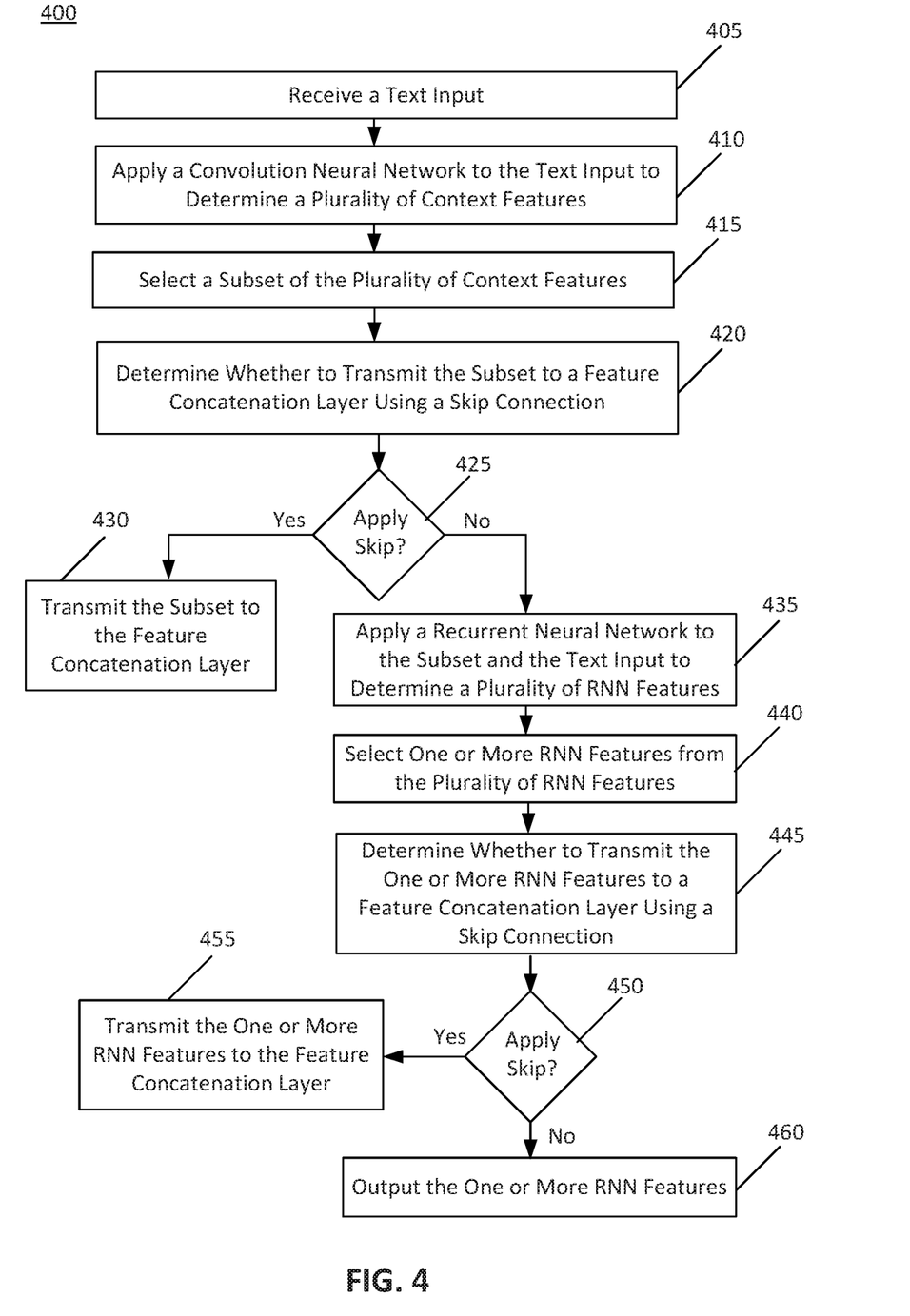
FIG. 4 depicts a flowchart illustrating a method for extracting context features, according to some embodiments.

FIG. 4 depicts a flowchart illustrating a method 400 for extracting context features, according to some embodiments. Method 400 shall be described with reference to FIG. 1; however, method 400 is not limited to that example embodiment.

In an embodiment, HCU 110 may utilize method 400 to process input 120. Method 400 may identify various points for HCU 110 to use a skip connection to transmit an identified feature to a feature concatenation layer. While method 400 is described with reference to HCU 110, method 400 may be executed on any HCU, such as an HCU 310 as described with reference to FIG. 3A or FIG. 3B, any computing device, such as, for example, the computer system described with reference to FIG. 6, and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, HCU 110 may receive a text input. HCU 110 may be implemented in a machine learning and/or artificial intelligence system. The text input may be input 120 and may comprise one or more characters and/or text strings. In an embodiment, the text input may be a computer file or document. The text input may have been received from a document including text that has been identified using optical character recognition (OCR) techniques.

At 410, HCU 110 may apply a convolutional neural network to the text input to determine a plurality of context features 140. As described above, the convolutional neural network may be implemented in convolutional layer 130.

Convolutional layer 130 may use one or more convolutional neural network channels to process the text input. In an embodiment, the convolutional neural network may operate on individual characters of the text input and/or use a one-dimensional convolution operation. The convolution may be a smoothing or a type of moving average. The convolution may use a soft mask of weights followed by a non-linear function.

At 415, HCU 110 may select a subset of the plurality of context features 140. Feature selector 150A may perform this selection. Feature selector 150A may perform this selection depending on the training of the convolutional layer in feature selector 150A. Feature selector 150A may identify particular features deemed relevant by the machine learning algorithm depending on the weighted values identified using a training set. In this manner, feature selector 150A may select a subset of the plurality of context features 140. In an embodiment, feature selector 150A may select all of context features 140.

At 420, HCU 110 may determine whether to transmit the subset to a feature concatenation layer using a skip connection. Feature selector 150A may perform this determination according to the training set used to train the convolutional layer of feature selector 150A. Based on this configuration, at 425, feature selector 150A may determine whether to apply the skip connection. If feature selector 150A applies the skip connection, feature selector 150A may the transmit the subset to the feature concatenation layer at 430. The skip connection may bypass other HCUs that are chained to HCU 110.

At 425, if feature selector 150A instead determines that a skip connection should not be applied to the subset, then at 435, HCU 110 may apply a recurrent neural network to the subset and/or the text input to determine a plurality of RNN features 170. The recurrent neural network may be applied using recurrent layer 160.

At 440, HCU 110 may use feature selector 150B to select one or more RNN features 170 from the plurality of RNN features 170. The RNN features 170 may be selected based on the training of the convolutional layer of feature selector 150B.

At 445, feature selector 150B may determine whether to transmit the RNN features 170 to a feature concatenation layer using a skip connection. Similar to the determination performed at 420 and 425, feature selector 150B may determine whether to use a skip connection depending on the configuration of feature selector 150B based on one or more training sets used to configure feature selector 150B. At 450, feature selector 150B may determine whether to apply a skip connection.

If feature selector 150B applies the skip connection, HCU 110 may transmit the RNN features 170 to a feature concatenation layer at 455. The feature concatenation layer may be the same as the feature concatenation layer receiving the subset of context features 140 from feature selector 150A. When HCU 110 transmits the RNN features 170 at 455, HCU 110 may bypass other HCUs in a chain to deliver the RNN features 170 to the feature concatenation layer.

At 460, if feature selector 150B does not apply the skip connection in 450, then HCU 110 may output the RNN features 170. If HCU 110 is configured into a chain of HCUs, the output of the RNN features 170 may be an input to a subsequent HCU. In an embodiment, this output may be a hierarchical concept depending on the configuration of the convolutional layer in feature selector 50B. The output may then be transmitted to a feature concatenation layer, a convolutional layer, and/or a fully connected layer to generate one or more key values and/or corresponding probabilities.

Figure 5:
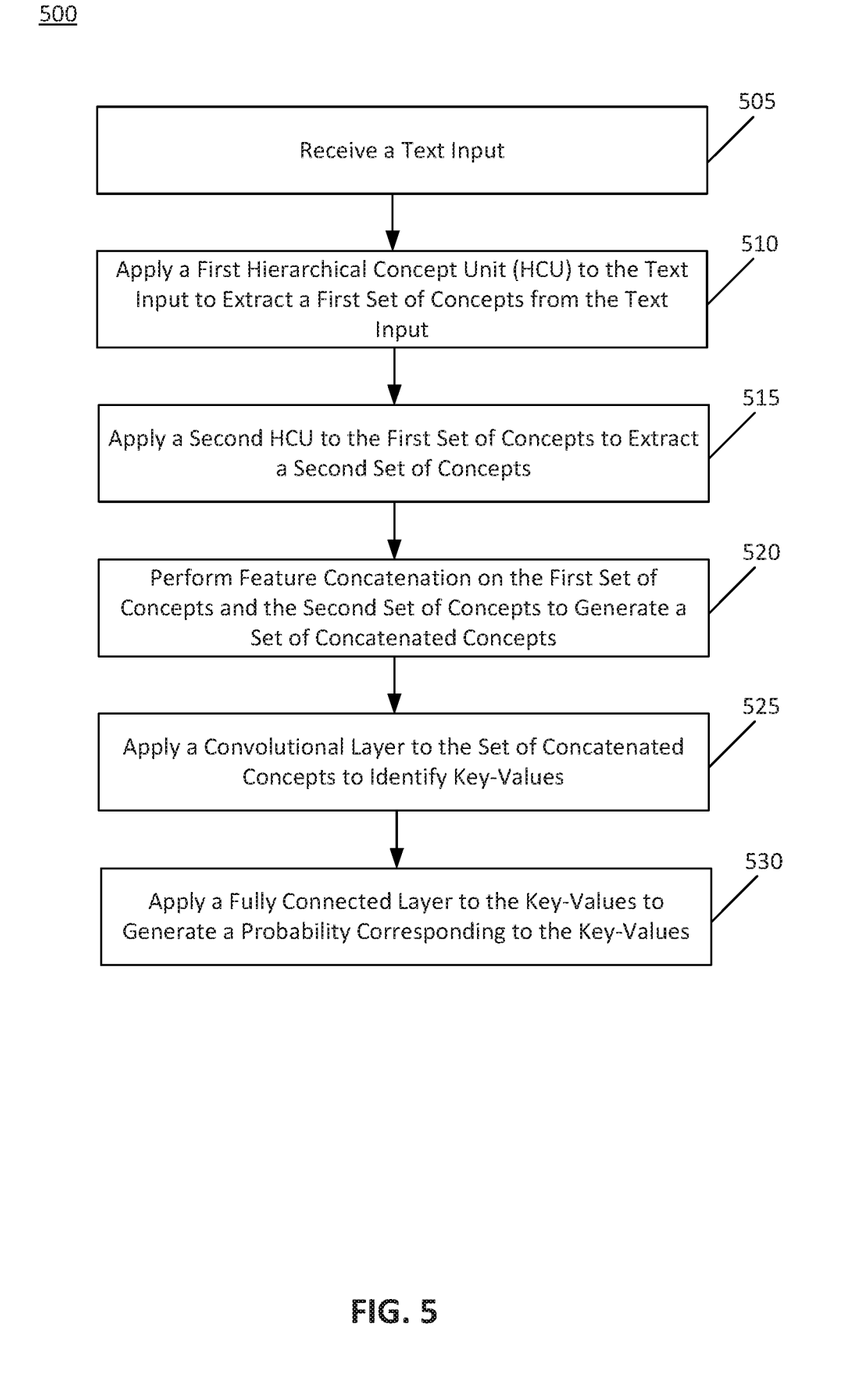
FIG. 5 depicts a flowchart illustrating a method for extracting key values, according to some embodiments.

FIG. 5 depicts a flowchart illustrating a method 500 for extracting key values, according to some embodiments. Method 500 shall be described with reference to FIG. 3A; however, method 500 is not limited to that example embodiment.

In an embodiment, HCU configuration 300A may utilize method 500 to extract key values and/or corresponding probabilities. Method 500 may identify various key values from a text input as well as the probabilities of the key values. While method 500 is described with reference to HCU configuration 300A, method 500 may be executed on any combination of HCUs, such as an HCU configuration 300B as described with reference to FIG. 3B, or any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

At 505, HCU configuration 300A may receive a text input at HCU 310. The text input may include words 320 and may comprise one or more characters and/or text strings. In an embodiment, the text input may be a computer file or document. The text input may have been received from a document including text that has been identified using optical character recognition (OCR) techniques.

At 510, HCU configuration 300A may apply a first HCU 310A to the text input to extract a first set of concepts 360 from the text input. The first set of concepts 360 may include one or more hierarchical concepts. Depending on the configuration of HCU 310A, HCU 310A may be configured to identify a first level of hierarchical concepts from the text input. For example, the first HCU 310A may identify character-level concepts while subsequent HCUs may identify higher-level concepts such as words or sentences. The first HCU 310A may also transmit one or more hierarchical concepts from the first HCU 310A to a feature concatenation layer. This transmission may be performed by a feature selector in the first HCU 310A. Using a skip connection may transmit the hierarchical concepts in a manner that bypasses or "skips" a second HCU. In an embodiment, the first HCU 310A may transmit the hierarchical concepts to a second HCU 310B.

At 515, HCU configuration 300A may apply a second HCU 310B to the first set of concepts 360 to extract a second set of concepts 370. HCU 310B may operate in a manner similar to HCU 310A by analyzing received concept 360 data. HCU 310B, however, may be configured to identify different concepts from HCU 310A. For example, HCU 310B may be configured to identify hierarchical concepts related to identified words while HCU 310A may be configured to identify hierarchical concepts related to characters. Based on this analysis, HU 310B may extract concepts 370 based on the concepts 360 received from HCU 310A.

At 520, HCU configuration 300A may perform feature concatenation on the first set of concepts 360 and the second set of concepts 370 to generate a set of concatenated concepts. HCU configuration 300A may use feature concatenation layer 382 to perform the concatenation. The set of concatenated concepts may represent an aggregation of the concepts received from HCU 310A and HCU 310B. In an embodiment where HCU configuration 300A includes more HCUs, feature concatenation layer 382 may receive concept information from the multiple HCUs and perform the concatenation. Feature concatenation layer 382 may receive the concept information from skip connections utilized by the feature selectors of the HCUs.

At 525, HCU configuration 300A may apply a convolutional layer 384 to the set of concatenated concepts to identify key values. Convolutional layer 384 may apply a convolutional neural network to the set of concatenated concepts. Convolutional layer 384 may apply a convolution having a window size of one (1). This type of convolution at convolutional layer 384 may allow for learning how to transform a lower-level concept (such as, for example, a character) to a higher-level concept (such as, for example, key types and key values). Convolutional layer 384 may also identify the particular processes applied by each HCU to perform its processing or transformation to yield a selected concept.

At 530, HCU configuration 300A may apply a fully connected layer 390 to the key values to generate a probability corresponding to the key values. The probability may be an indicator of the strength or confidence in an identification of a particular key value. Fully connected layer 390 may use a fully connected neural network. The fully connected neural network may use a linear combination of concepts and weights followed by a non-linear function to generate the probabilities.

Figure 6:
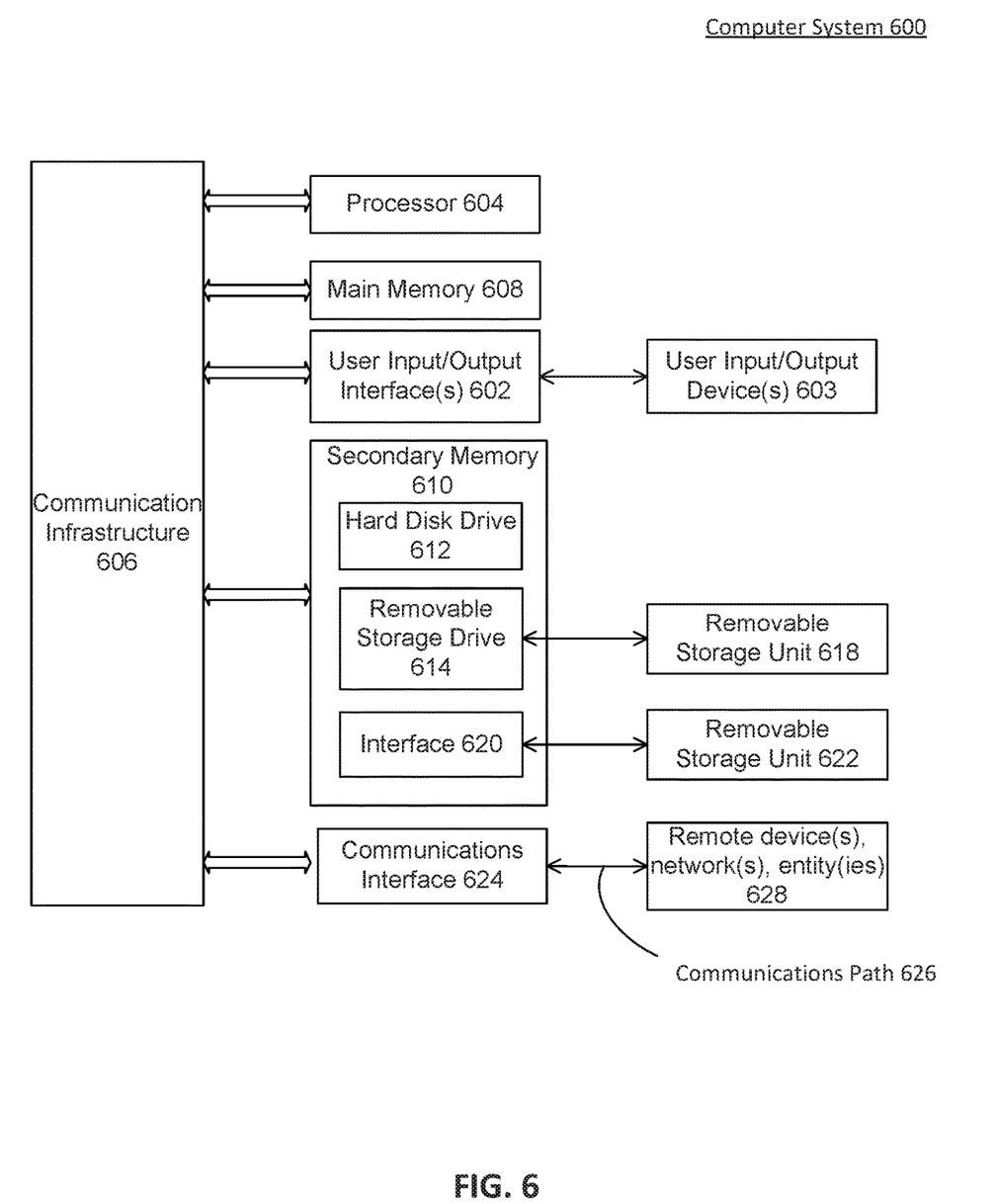
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for extracting key value information in an optical character recognition (OCR) system, comprising:
   receiving a text input, wherein symbols of the text input have been identified using an OCR technique;
   applying a convolutional neural network (CNN) to the text input to determine a plurality of context features of the text input indicating patterns of symbols of the text input;
   selecting a subset of the plurality of context features based on a machine learning algorithm of the CNN;
   applying a recurrent neural network (RNN) to the subset to determine a plurality of RNN features, wherein the RNN designates the plurality of RNN features as relevant to extracting a key value from the symbols of the text input; and
   transmitting one or more RNN features from the plurality of RNN features to a feature concatenation layer using a skip connection to extract the key value.

2. The computer-implemented method of claim 1, wherein applying the CNN further comprises:
   applying a one-dimensional window during a convolution operation.

3. The computer-implemented method of claim 1, further comprising:
   selecting one or more context features of the plurality of context features; and
   transmitting the one or more context features to the feature concatenation layer using a second skip connection.

4. The computer-implemented method of claim 1, further comprising:
   selecting a subset of the plurality of RNN features; and
   transmitting the subset of the plurality of RNN features to a second CNN.

5. The computer-implemented method of claim 1, wherein the transmitting further comprises:
   transmitting the one or more RNN features to the feature concatenation layer by bypassing a second CNN and a second RNN.

6. The computer-implemented method of claim 1, further comprising:
   aggregating the one or more RNN features at the feature concatenation layer with a second set of RNN features received from a second RNN or a second set of context features received from a second CNN to generate a set of concatenated concepts.

7. The computer-implemented method of claim 6, further comprising:
   applying a convolutional layer to the set of concatenated concepts to identify one or more key values.

8. The computer-implemented method of claim 7, further comprising:
   applying a fully connected layer to the one or more key values to determine a probability corresponding to the one or more key values.

9. A non-transitory computer-readable device having instructions stored thereon that, when executed by at least one computing device, cause the at least one computing device to perform operations comprising:
   receiving a text input, wherein symbols of the text input have been identified using an OCR technique;

applying a convolutional neural network (CNN) to the text input to determine a plurality of context features of the text input indicating patterns of symbols of the text input;

selecting a subset of the plurality of context features based on a machine learning algorithm of the CNN;

applying a recurrent neural network (RNN) to the subset to determine a plurality of RNN features, wherein the RNN designates the plurality of RNN features as relevant to extracting a key value from the symbols of the text input; and transmitting one or more RNN features from the plurality of RNN features to a feature concatenation layer using a skip connection to extract the key value.

10. The non-transitory computer-readable device of claim 9, wherein applying the CNN further comprises:

applying a one-dimensional window during a convolution operation.

11. The non-transitory computer-readable device of claim 9, the operations further comprising:

selecting one or more context features of the plurality of context features; and transmitting the one or more context features to the feature concatenation layer using a second skip connection.

12. The non-transitory computer-readable device of claim 9, the operations further comprising:

selecting a subset of the plurality of RNN features; and transmitting the subset of the plurality of RNN features to a second CNN.

13. The non-transitory computer-readable device of claim 9, wherein the transmitting further comprises:

transmitting the one or more RNN features to the feature concatenation layer by bypassing a second CNN and a second RNN.

14. The non-transitory computer-readable device of claim 9, the operations further comprising:

aggregating the one or more RNN features at the feature concatenation layer with a second set of RNN features received from a second RNN or a second set of context features received from a second CNN to generate a set of concatenated concepts.

15. The non-transitory computer-readable device of claim 14, the operations further comprising:

applying a convolutional layer to the set of concatenated concepts to identify one or more key values.

16. The non-transitory computer-readable device of claim 15, the operations further comprising:

applying a fully connected layer to the one or more key values to determine a probability corresponding to the one or more key values.

17. A system, comprising:

a memory; and at least one processor coupled to the memory and configured to:

receive a text input, wherein symbols of the text input have been identified using an OCR technique;

apply a convolutional neural network (CNN) to the text input to determine a plurality of context features of the text input indicating patterns of symbols of the text input;

select a subset of the plurality of context features based on a machine learning algorithm of the CNN;

apply a recurrent neural network (RNN) to the subset to determine a plurality of RNN features, wherein the RNN designates the plurality of RNN features as relevant to extracting a key value from the symbols of the text input; and transmit one or more RNN features from the plurality of RNN features to a feature concatenation layer using a skip connection to extract the key value.

18. The system of claim 17, wherein the at least one processor is further configured to:

select one or more context features of the plurality of context features; and transmit the one or more context features to the feature concatenation layer using a second skip connection.

19. The system of claim 17, wherein to transmit the one or more RNN features, the at least one processor is further configured to:

transmit the one or more RNN features to the feature concatenation layer by bypassing a second CNN and a second RNN.

20. The system of claim 17, wherein the at least one processor is further configured to:

aggregate the one or more RNN features at the feature concatenation layer with a second set of RNN features received from a second RNN or a second set of context features received from a second CNN to generate a set of concatenated concepts;

apply a convolutional layer to the set of concatenated concepts to identify one or more key values; and apply a fully connected layer to the one or more key values to determine a probability corresponding to the one or more key values.

* * * * *